United States Patent
Seok (10) Patent No.: US 9,923,324 B2
(45) Date of Patent: Mar. 20, 2018

(54) AC LINE FILTER AND AC-TO-DC RECTIFIER MODULE

(71) Applicant: IXYS Corporation, Milpitas, CA (US)

(72) Inventor: Kyoung Wook Seok, Milpitas, CA (US)

(73) Assignee: IXYS Corporation, Milpitas, CA (US)

( * ) Notice: Subject to any disclaimer, the term of this patent is extended or adjusted under 35 U.S.C. 154(b) by 183 days.

(21) Appl. No.: 14/611,193

(22) Filed: Jan. 31, 2015

(65) Prior Publication Data

US 2016/0226394 A1  Aug. 4, 2016

(51) Int. Cl.
| | |
|---|---|
| H02M 7/00 | (2006.01) |
| H02M 7/217 | (2006.01) |
| H02M 7/04 | (2006.01) |
| H02M 1/00 | (2006.01) |
| H01R 31/06 | (2006.01) |
| H02M 1/12 | (2006.01) |
| H02M 1/44 | (2007.01) |
| H02M 7/219 | (2006.01) |
| H01R 13/66 | (2006.01) |

(52) U.S. Cl.
CPC ....... *H01R 31/065* (2013.01); *H01R 13/6675* (2013.01); *H02M 1/126* (2013.01); *H02M 1/44* (2013.01); *H02M 7/219* (2013.01); *H02M 2007/2195* (2013.01); *Y02B 70/1408* (2013.01)

(58) Field of Classification Search
CPC ............... H02M 7/003; H02M 7/2019; H02M 2007/2195
USPC .................. 363/108, 125–129, 142, 143, 146
See application file for complete search history.

(56) References Cited

U.S. PATENT DOCUMENTS

| | | | |
|---|---|---|---|
| 4,408,171 A | 10/1983 | Akino et al. | 333/177 |
| 4,888,675 A * | 12/1989 | Kumar | H02M 1/14 |
| | | | 333/181 |
| 5,195,232 A | 3/1993 | Frederick | 29/502.1 |
| 5,340,944 A | 8/1994 | Wang | 174/52.1 |
| 5,475,347 A | 12/1995 | Kwak | 333/185 |

(Continued)

OTHER PUBLICATIONS

"Application Note: EMC/EMI Filter Design with RB Common-Mode Chokes", by Schaffner Group, 22 pages (copyright Jul. 2013).

*Primary Examiner* — Adolf Berhane
*Assistant Examiner* — Gary Nash
(74) *Attorney, Agent, or Firm* — Imperium Patent Works; T. Lester Wallace; Darien K. Wallace (57) ABSTRACT

An AC Line Filter/Rectifier Module (ACLF/RM) has a metal housing and an outward appearance of a conventional AC line filter, but the ACLF/RM includes circuitry that performs both EMI filtering and line filtering as well as very efficient AC-to-DC rectification. Rectification circuitry within the ACLF/RM rectifies an AC voltage signal received onto AC input module terminals and outputs a rectified version of the AC voltage signal onto DC output module terminals. The rectification circuitry includes at least one low forward voltage rectifier, where the low forward voltage rectifier includes a bipolar transistor and a diode. Inductive components perform both EMI filtering and line filtering as well as current splitting required to drive the bipolar transistors of the low forward voltage rectifiers. Due to the use of the low forward voltage rectifiers, the AC-to-DC conversion is more efficient than would be case were a conventional diode bridge rectifier employed.

29 Claims, 5 Drawing Sheets

FIRST EMBODIMENT (56) References Cited

U.S. PATENT DOCUMENTS

| | | | | |
|---|---|---|---|---|
| 7,744,419 B2 | 6/2010 | Blum et al. | | 439/620.1 |
| 7,978,489 B1* | 7/2011 | Telefus | | H01R 13/24 363/142 |
| 8,624,689 B2 | 1/2014 | Hsieh et al. | | 333/185 |
| 8,649,199 B2 | 2/2014 | Seok | | 363/147 |
| 8,737,094 B2 | 5/2014 | Seok et al. | | 363/21.14 |
| 2002/0075711 A1* | 6/2002 | Miles | | H02M 7/003 363/146 |
| 2003/0043607 A1* | 3/2003 | Vinciarelli | | H02M 1/4208 363/61 |
| 2003/0128561 A1* | 7/2003 | Azuma | | H02J 7/022 363/65 |
| 2004/0156160 A1* | 8/2004 | Choo | | H02H 7/1252 361/118 |
| 2005/0134526 A1* | 6/2005 | Willem | | G06F 3/1446 345/1.3 |
| 2007/0165376 A1* | 7/2007 | Bones | | H01L 25/162 361/688 |
| 2009/0213630 A1* | 8/2009 | Wu | | H01R 25/003 363/126 |
| 2009/0244943 A1* | 10/2009 | Yamada | | H02M 1/4225 363/126 |
| 2009/0267417 A1* | 10/2009 | Lee | | H02J 9/062 307/65 |
| 2010/0054007 A1* | 3/2010 | Jung | | H02M 7/06 363/126 |
| 2012/0230075 A1* | 9/2012 | Lee | | H02M 1/36 363/128 |
| 2012/0294053 A1* | 11/2012 | Yan | | H02M 1/32 363/53 |
| 2013/0003427 A1* | 1/2013 | Pan | | H02M 1/4225 363/44 |
| 2013/0107583 A1* | 5/2013 | Seok | | H02M 3/33576 363/21.12 |
| 2013/0148998 A1* | 6/2013 | Shimura | | G03G 15/80 399/88 |
| 2013/0235626 A1* | 9/2013 | Jang | | H02M 1/4216 363/37 |
| 2013/0249529 A1* | 9/2013 | Seok | | H02M 3/33576 323/364 |
| 2013/0250640 A1* | 9/2013 | Land | | H02M 7/06 363/126 |
| 2013/0279217 A1* | 10/2013 | Tran | | H02M 7/217 363/44 |
| 2013/0285210 A1* | 10/2013 | Seok | | H01L 27/0647 257/566 |
| 2013/0314962 A1* | 11/2013 | Chung | | H02M 1/126 363/126 |
| 2014/0028099 A1* | 1/2014 | van Kalken | | H02J 9/061 307/64 |
| 2014/0029324 A1* | 1/2014 | Sanae | | H05K 7/209 363/141 |

* cited by examiner

FRONT VIEW
OF THE ACLF/RM

FIG. 1

SIDE VIEW OF
THE ACLF/RM

FIG. 2

BOTTOM VIEW
OF THE ACLF/RM

FIG. 3

PERSPECTIVE VIEW OF THE TOP
OF THE ACLF/RM

FIG. 4

PERSPECTIVE VIEW OF THE
BOTTOM OF THE ACLF/RM

FIG. 5

PERSPECTIVE VIEW OF TOP WITH
METAL HOUSING REMOVED

FIG. 6

CROSS-SECTIONAL VIEW TAKEN
ALONG LINE A-A' OF FIG. 3

FIG. 7

FIRST EMBODIMENT
FIG. 8

SECOND EMBODIMENT
FIG. 9

FIG. 10 — FIRST EMBODIMENT WITH FUSE AND SWITCH

FIG. 11 — SECOND EMBODIMENT WITH FUSE AND SWITCH

AC LINE FILTER AND AC-TO-DC RECTIFIER MODULE

TECHNICAL FIELD

The described embodiments relate to AC line filters and to AC-to-DC rectifiers, and to related structures and methods.

BACKGROUND INFORMATION

Many electronic appliances and devices include an AC line filter as well as a full-wave bridge rectifier. Although the AC line filter component goes by a few different names in the art such as, for example, "EMI filter", the term "AC Line Filter" will be used here. The electronic appliance or device receives AC power through its AC line filter. The AC line filter in some cases is a module assembly that includes a standard IEC 60320-1 C14 three-terminal power inlet socket through which 110 volt (RMS) AC wall power is received onto the AC line filter. The socket has three input terminals, one of which is a ground terminal GND. The other two input terminals may be referred to as the LINE terminal and the NEUTRAL terminal. A power cord, having a standard plug that engages the 110 volt AC socket, is coupled to the electronic device to provide AC wall power through the cord to the AC line filter. In addition to the three input terminals of the power input socket, the AC line filter module also has three output terminals. One of these output terminals is a ground terminal GND. The 110 volt (RMS) AC as output by the AC line filter across these other two output terminals is then rectified by the full-wave bridge rectifier into a rough DC voltage. This rough DC voltage is often times then smoothed or stored in a capacitor that is connected across the two output terminals of the full-wave bridge rectifier. If, for example, the input AC power to the electronic appliance is 110 volts (RMS), then the rough DC voltage as output by the full-wave bridge rectifier has an approximate DC voltage of 157 volts DC.

SUMMARY

An AC Line Filter/Rectifier Module (ACLF/RM) has a plurality of AC input module terminals, a plurality of DC output module terminals, circuitry that performs EMI filtering and line filtering, rectification circuitry that rectifies an AC voltage signal received onto the AC input module terminals and outputs a rectified version of the AC voltage signal onto the DC output module terminals, and a housing that houses the circuitry. The housing is typically largely, or entirely, made of metal. In one example, the novel ACLF/RM looks just like a commonly commercially available AC line filter module having a metal housing, but the novel ACLF/RM actually also includes very efficient AC-to-DC rectification circuitry. The rectification circuitry includes at least one low forward voltage rectifier, where the low forward voltage rectifier includes a bipolar transistor and a diode. The cathode of the diode is coupled to one of the emitter and the collector of the bipolar transistor, and the anode of the diode is coupled to the other of the emitter and the collector of the bipolar transistor.

In one example, the AC-to-DC rectification circuitry is a full-wave bridge rectifier that includes four low forward voltage rectifiers. In addition, the ACLF/RM includes two two-winding inductors (also referred to as transformers). These two two-winding inductors are coupled to the bipolar transistors of the low forward voltage rectifiers and perform current-splitting such that the four low forward voltage rectifiers work together as a very efficient full-wave bridge rectifier.

As compared to providing a separate conventional AC line filter module and a separate full-wave bridge rectifier disposed outside of the module where the full-wave bridge rectifier includes four low forward voltage rectifiers and two associated two-winding inductors, the novel ACLF/RM performs EMI line filtering and also performs rectification using the low forward voltage rectifiers but it does so using two and only two two-winding inductors. These two two-winding inductors are advantageously used both for EMI filtering and line filtering purposes (as in a conventional AC line filter) as well as to perform the current splitting necessary to drive the bipolar transistors of the full-wave bridge rectifier. In accordance with the invention, due to only having the two two-winding inductors, the combined EMI filtering and rectification functions are realized with reduced cost as compared to an implementation involving a conventional AC line filter module that does not contain rectification circuitry.

In another advantageous aspect, the bipolar transistors and associated diodes of the low forward voltage rectifiers are provided in the form of devices packaged in conventional and standard packages. In one example, an NPN bipolar transistor and its associated parallel diode of a low forward voltage rectifier are packaged together in a TO-262 package, and a PNP bipolar transistor and its associated parallel diode of another low forward voltage rectifier are packaged together in another TO-262 package. Two such TO-262-packaged NPN devices and two such TO-262-packaged PNP devices are used to realize the full-wave bridge rectifier of the ACLF/RM. Due to the use of standard TO-262 packages, no special lead frames and tooling and molds and packaging of the bipolar transistors and diodes is required. The bipolar transistors and associated parallel diodes are provided in the ACLF/RM in the form of four devices, where each device has a standard TO-262 package form factor and where each package contains a single RBJT (Reverse Bipolar Junction Transistor) die. An RBJT die involves a bipolar transistor and a parallel diode, where the bipolar transistor has a suitably high reverse breakdown withstand voltage. The parallel diode of the RBJT is realized as a distributed diode that is distributed across the RBJT die along with the bipolar transistor circuitry.

In yet another advantageous aspect, the metal housing of the ACLF/RM performs both its EMI shielding and suppression function (as in a conventional AC line filter module) as well an additional heat sinking function for an AC-to-DC rectifier. Heat dissipated in the full bridge AC-to-DC rectifier within the metal housing is sinked to outside by the metal housing. In one example, improved thermal contact between the TO-262 packages of the RBJT devices of the rectifier within the housing and the housing itself is provided by filling the housing with a thermally conductive the electrically insulative encapsulant or potting material. The encapsulant or potting material contacts the TO-262 packages and also contacts the inside of the metal housing and thereby conducts heat from the TO-262 packages to the metal of the metal housing. In a 500 watt example, no additional heat sink outside of the ACLF/RM is required to sink heat from the rectifier as would be the case were a conventional AC line filter module and a conventional external full-wave bridge rectifier employed. This is due to the efficiency of the low forward voltage rectifiers employed in the ACLF/RM and due to use of the metal housing of the ACLF/RM as a heat sink for the rectifier.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

The entirely of U.S. patent application Ser. No. 13/931,599, entitled "Full Bridge Rectifier Module", filed Jun. 28, 2013, by Kyoung Wook Seok, now U.S. Pat. No. 9,041,075, is incorporated by reference herein. As explained in the Ser. No. 13/931,599 patent application, there is conduction loss in the four diodes of a conventional full-wave bridge rectifier. The wasted energy is manifest as generated heat. Cost is often involved in providing heat sinking in order to remove this heat. In one example, such a full-wave bridge rectifier is the input full-wave bridge rectifier of an electronic appliance. The full-wave bridge rectifier receives 110 volts (RMS) AC power from a power source (for example, from 110 volts (RMS) AC wall power) and outputs a rectified DC voltage that is then smoothed or stored in an output storage capacitor. The rough DC voltage on the capacitor is about 157 volts. This circuit serves as the power-receiving front end of the electronic appliance.

There are four diodes in such a conventional full-wave bridge rectifier. U.S. patent application Ser. No. 13/931,599 patent application discloses a circuit referred to here as a "low forward voltage rectifier" that can be used in place of a diode in such a full-wave bridge rectifier. The "low forward voltage rectifier" includes a bipolar transistor and a parallel-connected diode. The term "low forward voltage rectifier" as it is used here in this patent document refers to one such bipolar transistor and its associated parallel-connected diode, and also may or may not include associated inductive current splitting circuitry that controls the base current of the bipolar transistor such that the transistor and its parallel-connected diode operate together as a low forward voltage rectifier. Where there ordinarily would be a larger forward voltage drop across a standard diode (for example, about 1.0 volts) when current is flowing through the diode in a conventional full-wave bridge rectifier, a lower forward voltage drop (for example, 0.3 volts to 0.4 volts) is seen across each rectifier of a full-wave bridge rectifier that employs low forward voltage rectifiers rather than conventional diodes. This lower forward voltage drop translates into higher energy efficiency, less heat generation in the full-wave bridge rectifier, and less cost involved in providing any necessary heat sinking.

FIG. 13 of the Ser. No. 13/931,599 patent application discloses a first embodiment of a new full-wave bridge rectifier component or part. The new full-wave bridge rectifier part involves four of the new low forward voltage rectifiers. This embodiment includes two two-winding inductors. Such a two-winding transformer can also be called a two-winding transformer, but the core preferably has an air gap. In the case of the core of the transformer being a toroid, the material of which the toroid is made provides a distributed air gap.

FIG. 28 of the Ser. No. 13/931,599 patent application also discloses a second embodiment of the new full-wave bridge rectifier part. This second embodiment also involves four of the new low forward voltage rectifiers and two two-winding inductors. These two different embodiments are in substantial measure functionally interchangeable.

In one implementation, a packaged electronic component or part is made where the part includes the entire full-wave bridge rectifier circuit. The various bipolar transistors, diodes and two-winding inductors are mounted onto a custom lead frame, and are then overmolded with plastic as set forth in the Ser. No. 13/931,599 patent application. In this way, the four low forward voltage rectifiers and the two two-winding inductors are all encapsulated together in a single injection molded plastic part. This part is a drop-in replacement for a standard full-wave bridge rectifier part available on the market, except that if the new improved full-wave bridge rectifier part is used then the user will see less energy waste and undesirable less heat generation.

Unfortunately, providing the two-winding inductors (the two transformers) involves an extra expense that is not present when using a conventional full-wave bridge rectifier. There are no such two-winding inductors in a conventional full-wave bridge rectifier. Moreover, the two-winding inductors are physically large and it may be difficult to include them in the same encapsulated device along with the bipolar transistors and diodes. The two-winding inductors cannot be made smaller because the main current flowing through the full-wave bridge rectifier has to flow through inductor windings, so the wire of the inductor has to be of a large diameter. Also, there is a substantial tooling cost involved both in making custom a leadframe (as set forth in FIG. 22 and FIG. 29 of the Ser. No. 13/931,599 patent application) and in making custom injection molded plastic molds required to make the new large custom part that is adequately large to accommodate the two-winding inductors. These are substantial costs.

In one novel aspect, a novel AC Line Filter/Rectifier Module (ACLF/RM) includes both an AC line filter and a full-wave bridge rectifier, where the full-wave bridge rectifier includes four of the "low forward voltage rectifiers." In a preferred embodiment, the ACLF/RM has a rated output power of 500 watts at forty degrees Celsius. This power rating is in the upper range (upper 25%) of output powers where an AC line filter would be permitted and typically used (on the input of an electronic appliance) because more complex and expensive power factor correction circuitry is not required by law or regulation. This power rating is about 500 watts. In accordance with the novel aspect, inductive components that would otherwise have to be included in the AC line filter are used not just for their line filtering functions, but rather are also used to perform a current splitting function so that they can drive the bipolar transistors of the low forward voltage rectifiers of the full-wave bridge rectifier.

Figure 1:
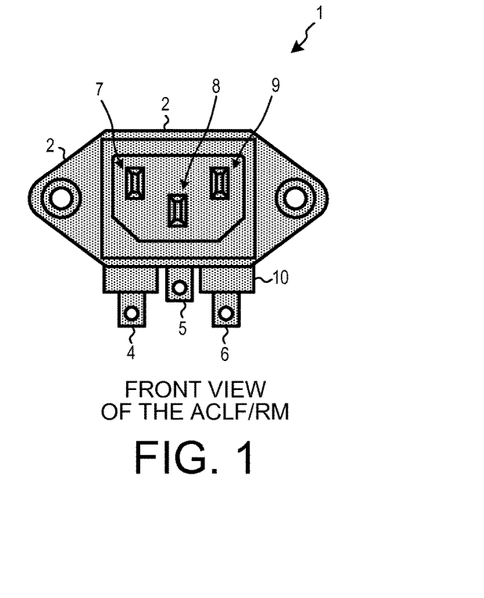
FIG. 1 is a front view of one embodiment of an AC Line Filter/Rectifier Module (ACLF/RM).
Figure 2:
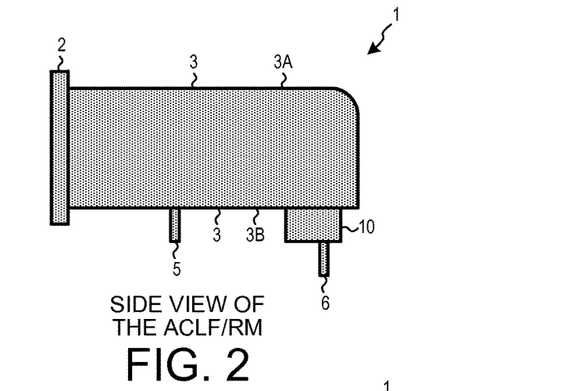
FIG. 2 is a side view of the ACLF/RM of FIG. 1.
Figure 3:
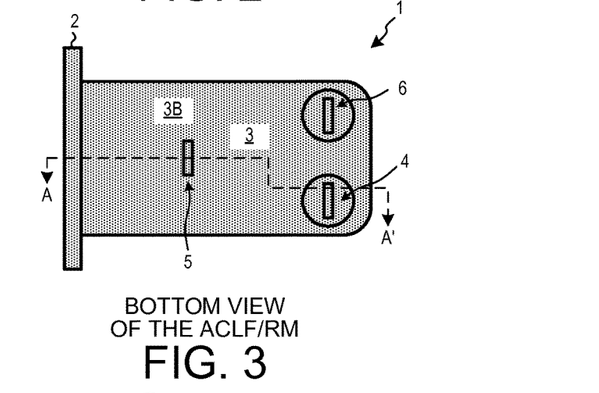
FIG. 3 is a bottom view of the ACLF/RM of FIG. 1.

FIG. 1 is a front view of one embodiment of an AC Line Filter/Rectifier Module (ACLF/RM) 1. FIG. 2 is a side view of the ACLF/RM 1. FIG. 3 is a bottom view of the ACLF/RM 1. Advantageously, the ACLF/RM 1 has the appearance of a common commercially available AC line filter module. The ACLF/RM 1 includes an IEC 60320 C14 AC inlet power socket portion 2, a metal housing 3, and three DC output module terminals 4, 5 and 6. The AC inlet power socket portion 2 includes three AC input module terminals 7, 8 and 9. AC input module terminal 8 is coupled to DC output module terminal 5. These terminals 8 and 5 are ground terminals. There are multiple ways of realizing the metal housing 3. In one example, two metal pieces are welded or otherwise joined together to make the metal housing. These two pieces are a stamped scoop-shaped case portion 3A a flat planar cover portion 3B.

Figure 4:
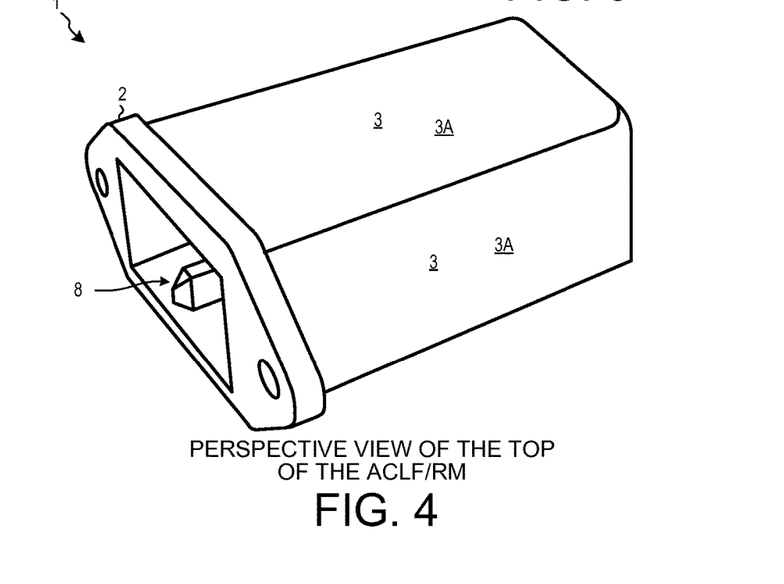
FIG. 4 is a perspective view from the vantage of a front/top corner of the ACLF/RM of FIG. 1.

FIG. 4 is a perspective view from the vantage of a front/top corner of the ACLF/RM 1.

Figure 5:
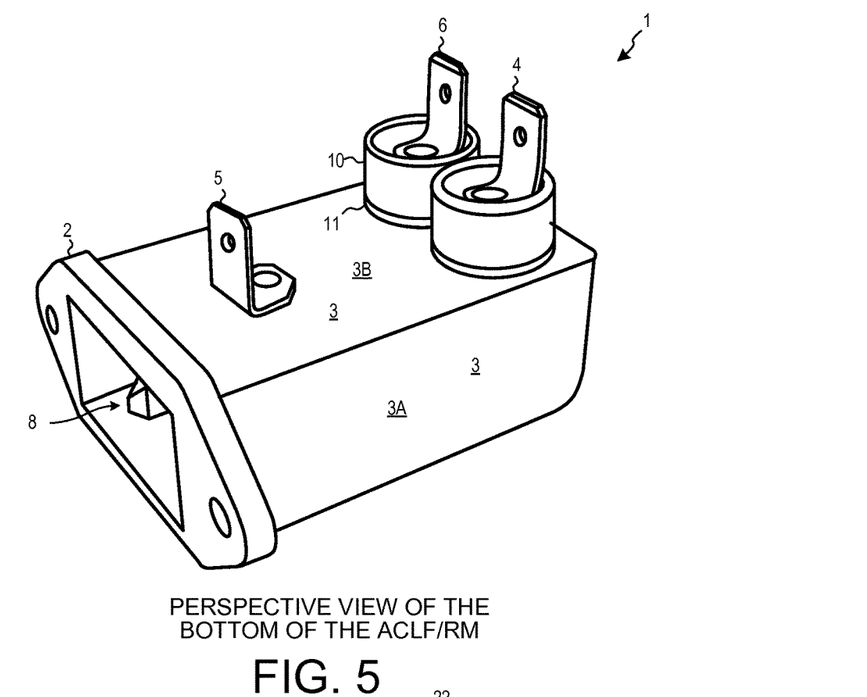
FIG. 5 is a perspective view from the vantage of a front/bottom corner of the ACLF/RM of FIG. 1.

FIG. 5 is a perspective view from the vantage of a front/bottom corner of the ACLF/RM 1. Terminal 5 is a tab terminal that is connected by a rivet 46 to the metal housing 3. Terminal 5 is also electrically connected to terminal 8 via a metal wire or strip 47. Terminal 6 is a tab terminal that is insulated from the metal housing 3 by an insulative plastic standoff 10 and insulative washer 11 and a second insulative washer 12 (not shown) located on the inside of the metal housing. Electrical connection is made from the metal tab terminal 6 on the outside of the metal housing, via a rivet 13 through the center of the insulative standoff 10 and the centers of the washers 11 and 12 to a rivet head (not shown) 13A located on the inside of the metal housing. The rivet 13 both holds the parts 12, 11, 10 and 6 together and also provides electrical continuity from the terminal tab 6 on the outside of the metal housing to the rivet head 13A on the inside of the metal housing. Terminal 4 is fixed to the metal housing in similar fashion.

Figure 6:
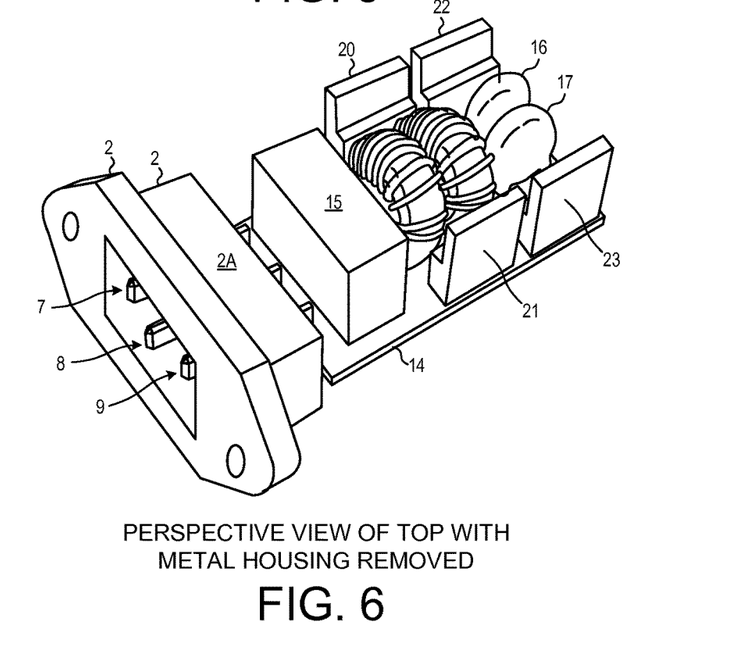
FIG. 6 is a perspective view from the same vantage as FIG. 4 except that the metal housing of the ACLF/RM is not shown.

FIG. 6 is a perspective view from the same vantage as FIG. 4 except that the metal housing 3 is not shown. The inlet power socket portion 2 has a hardened plastic block portion 2A that fits into and engages the open end of the metal housing 3. The three terminals 7, 8 and 9 are stamped metal members that extend through the plastic block portion 2A and then turn downward and engage a printed circuit board 14. Disposed on and soldered to the printed circuit board 14 are a first capacitor 15, a second capacitor 16, a third capacitor 17, a first two-winding inductor (transformer) 18, a second two-winding inductor (transformer) 19, a first RBJT (Reverse Bipolar Junction Transistor) 20, a second RBJT 21, a third RBJT 22, a fourth RBJT 23, and a bleed resistor 54 (not shown). Each RBJT includes a bipolar transistor and a parallel-connected diode packaged in a standard three-terminal TO-262 package.

Figure 7:
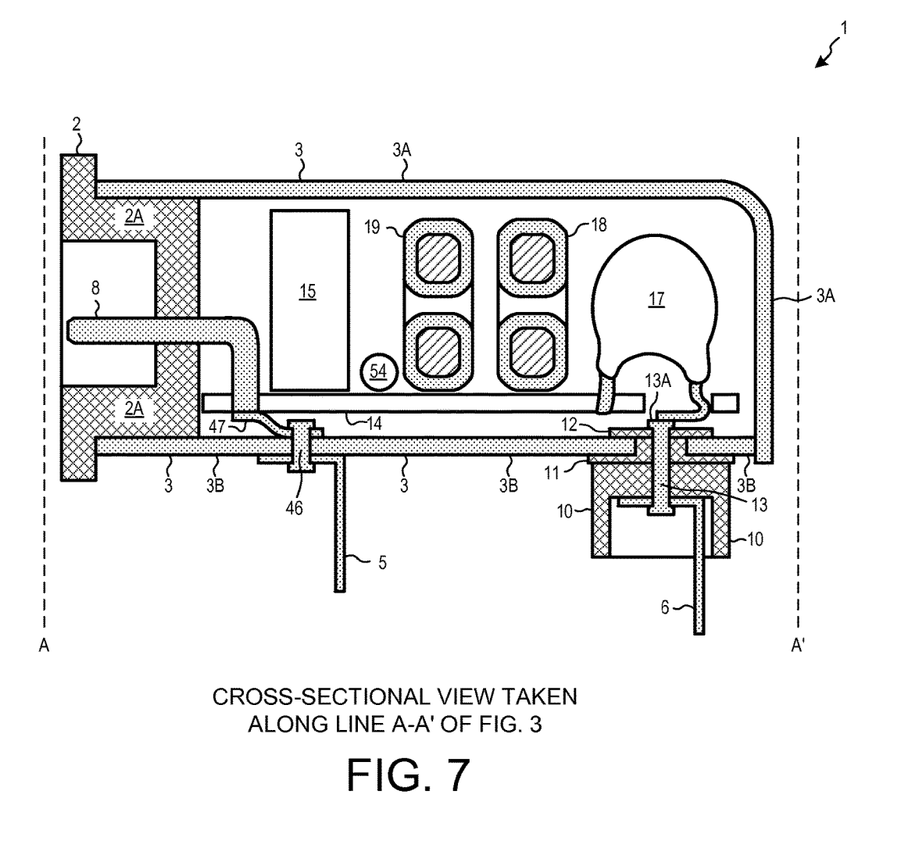
FIG. 7 is a simplified cross-sectional diagram taken along line A-A' of FIG. 3.

FIG. 7 is a simplified cross-sectional diagram taken along line A-A' of FIG. 3. The first two-winding inductor 18 includes a first core 24, a first winding 25 that is wound on the first core, and a second winding 26 that is wound on the first core. Similarly, the second two-winding inductor 19 includes a second core 27, a third winding 28 that is wound on the second core, and a fourth winding 29 that is wound on the second core. Although the two two-winding inductors 18 and 19 are illustrated as being of the same physical size, the first two-winding inductor 18 is actually physically smaller.

Figure 8:
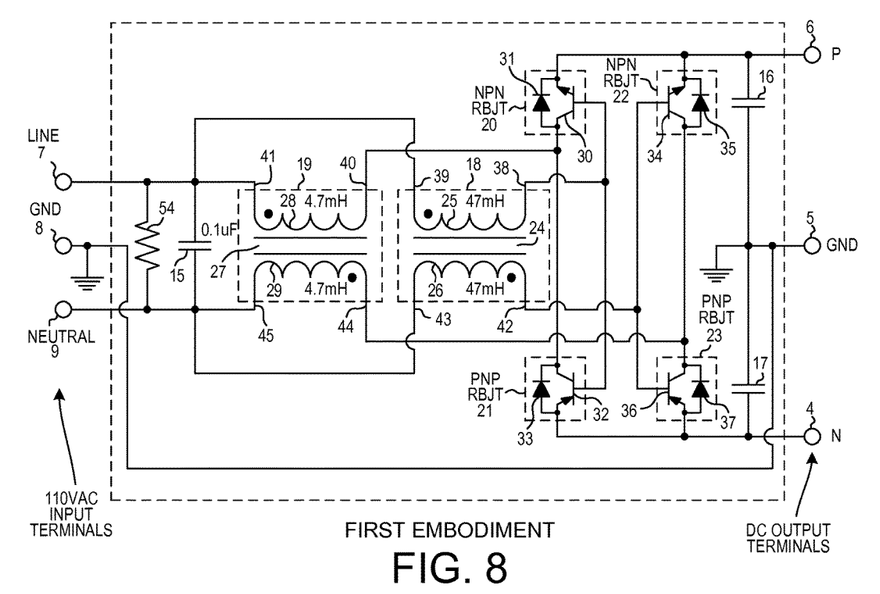
FIG. 8 is a circuit diagram of a first embodiment of the ACLF/RM of FIG. 1.

FIG. 8 is a circuit diagram of a first embodiment of the ACLF/RM 1. The first RBJT 20 includes a first bipolar transistor 30 and a first diode 31. The second RBJT 21 includes a second bipolar transistor 32 and a second diode 33. The third RBJT 22 includes a third bipolar transistor 34 and a third diode 35. The fourth RBJT 23 includes a fourth bipolar transistor 36 and a fourth diode 37. Transistors 30 and 34 are NPN transistors, and transistors 32 and 36 are PNP transistors.

A first terminal end 38 of the first winding 25 of the first two-winding inductor 18 is coupled to the bases of the bipolar transistors 30 and 32. A second terminal end 39 of the first winding 25 of the first two-winding inductor 18 is coupled to the LINE AC input module terminal 7.

A first terminal end 40 of the first winding 28 of the second two-winding inductor 19 is coupled to the collectors of the bipolar transistors 30 and 32. A second terminal end 41 of the first winding 28 of the second two-winding inductor 19 is coupled to the LINE AC input module terminal 7.

A first terminal end 42 of the second winding 26 of the first two-winding inductor 18 is coupled to the bases of the bipolar transistors 34 and 36. A second terminal end 43 of the second winding 26 of the first two-winding inductor 18 is coupled to the NEUTRAL AC input module terminal 9.

A first terminal end 44 of the second winding 29 of the second two-winding inductor 19 is coupled to the collectors of the bipolar transistors 34 and 36. A second terminal end 45 of the second winding 29 of the second two-winding inductor 19 is coupled to the NEUTRAL AC input module terminal 9.

The transistors 30, 34, 32, and 36 have reverse breakdown withstand voltages that are adequately high to withstand voltages across them when the ACLF/RM 1 is in use. In the case of the ACLF/RM 1 being a module designed to receive 110 volts (RMS) AC, the reverse breakdown withstand voltage of the bipolar transistors in one example is at least 200 volts. This reverse breakdown withstand voltage requirement is determined as follows. If the input AC power is 110 volts AC (RMS), then the rectified voltage out of the full-wave bridge rectifier is about 160 volts DC. At an average current of 4 amperes, the ACLF/RM 1 supplies about 500 watts to the appliance. In order to be able to withstand a 160 volt reverse voltage condition in the bipolar transistors so that the bipolar transistors will not fail when the ACLF/RM is used in receiving 110 volts AC, an amount of margin is required beyond the 160 volts, so bipolar transistors that do not suffer reverse breakdown for voltages less than 200 volts are used. The peak current through the bipolar transistors is about 20 amperes for a 500 watt application, and a margin is required, so transistors are used whose maximum collector-to-emitted current is at least 30 amperes. So the bipolar transistors are 200V (reverse breakdown withstand voltage), 30 A bipolar transistors.

Bleed resistor 54 is an optional component. Each of the capacitors 16 and 17 is, in some examples, a three-terminal capacitor referred to in the art as a feed-through capacitor. For example, capacitor 16 may be a feed-through capacitor. The feed-through capacitor has two feed-through leads that are coupled to a first plate of the capacitor. The feed-through capacitor also has a third lead that is coupled to a second plate of the capacitor. The first feed-through lead is coupled to receive current from the node at the emitter sides of bipolar transistors 30 and 35 and the second feed-through lead is coupled to supply current to the P DC output module terminal 6. The third lead of the capacitor is coupled to the GND DC output module terminal 5. In similar fashion, capacitor 17 may be implemented as a second three-terminal feed-through capacitor. In one example of the circuit of FIG. 8, the two two-winding inductors (transformers) 18 and 19 are the only inductive components disposed within the housing of the ACLF/RM.

Figure 9:
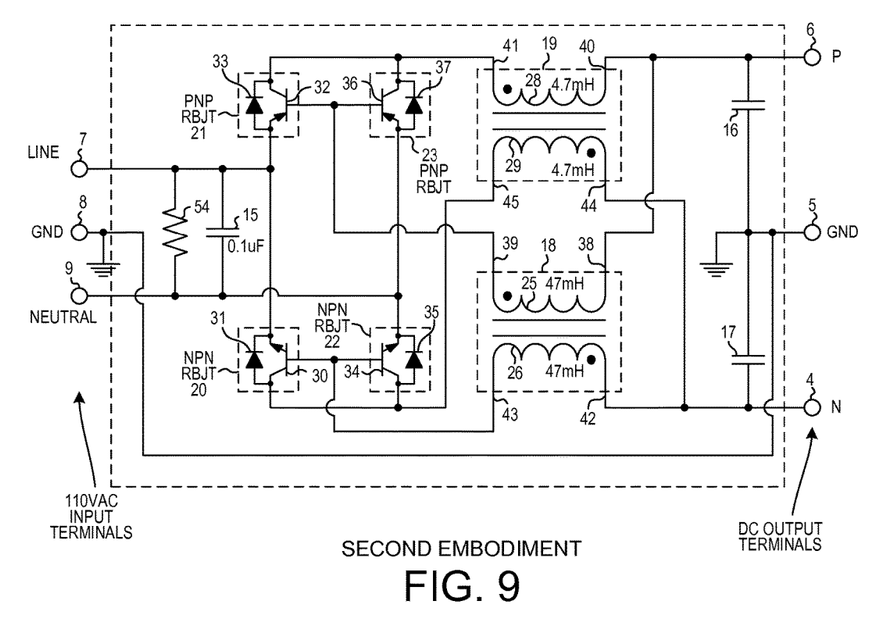
FIG. 9 is a circuit diagram of a second embodiment of the ACLF/RM of FIG. 1.

FIG. 9 is a circuit diagram of a second embodiment of the ACLF/RM 1. The components of the second embodiment are the same as the components of the first embodiment, but they are arranged differently as illustrated.

Figure 10:
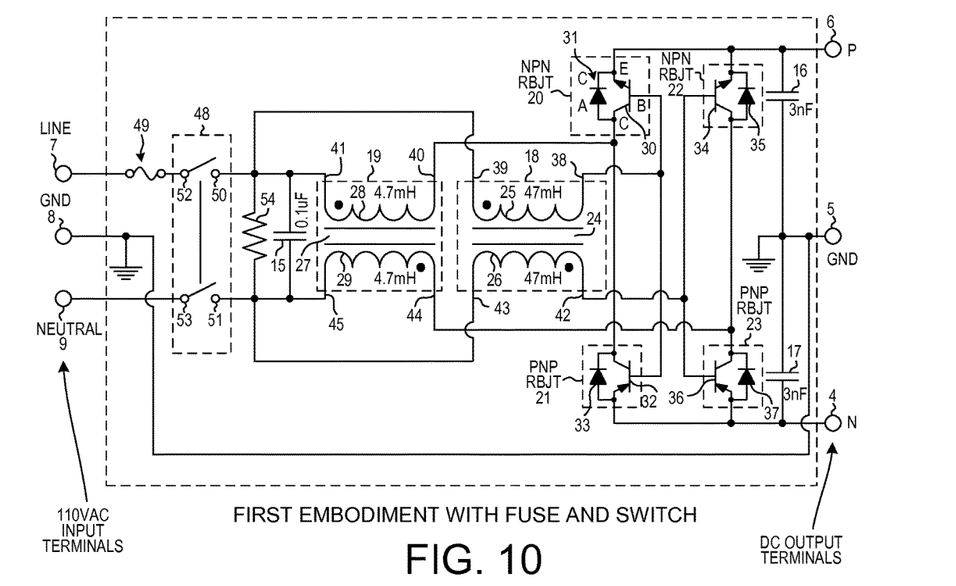
FIG. 10 is a circuit diagram of an example of the first embodiment in which a mechanical ON/OFF switch and a fuse are provided.

FIG. 10 is a circuit diagram of an example of the first embodiment in which a mechanical ON/OFF switch 48 and a fuse 49 are provided. The mechanical ON/OFF switch 48 is a double-pole single-throw (DPST) switch that has a first terminal 50, a second terminal 51, a third terminal 52, and a fourth terminal 53. The mechanical switch 48 has a multi-position rocker button that is accessible from outside the ACLF/RM so that a finger of a user of the ACLF/RM can manually manipulate the rocker button and thereby turn power on and off to the appliance. In a first switch position (as illustrated) of the rocker button, the first terminal 50 is disconnected from the third terminal 52 and the second terminal 51 is disconnected from the fourth terminal 53. In a second switch position of the rocker button, the first terminal 50 is connected through the switch to the third terminal 52 and the second terminal 51 is connected through the switch to the fourth terminal 53. The third terminal 52 of the switch is coupled via the fuse 49 to the LINE AC input module terminal 7. The fourth terminal 53 of the switch is directly connected to the NEUTRAL AC input module terminal 9.

Figure 11:
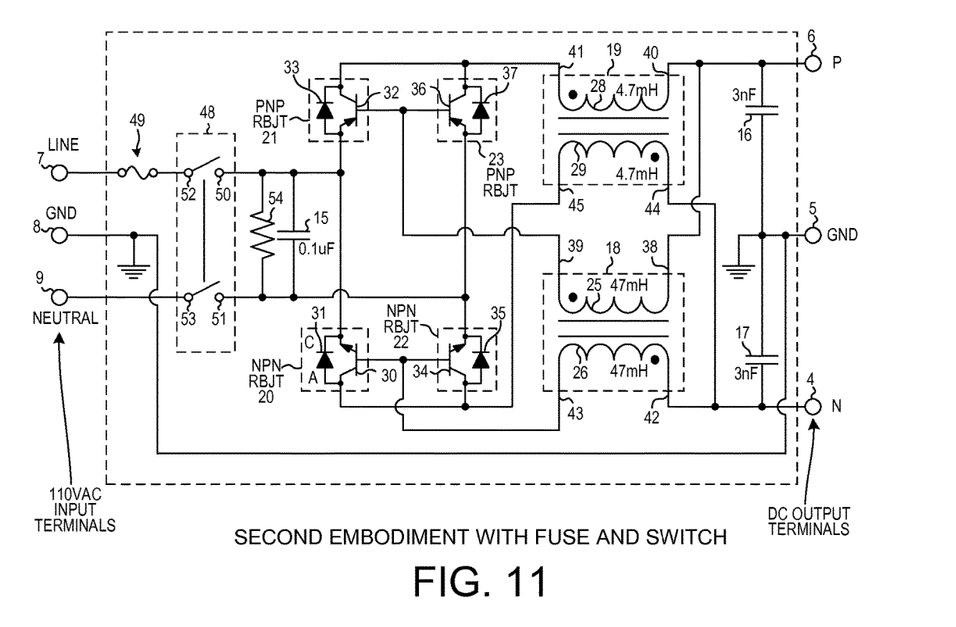
FIG. 11 is a circuit diagram of an example of the second embodiment in which an ON/OFF switch and a fuse are provided.

FIG. 11 is a circuit diagram of an example of the second embodiment in which the switch 48 and the fuse 49 are provided.

Although certain specific embodiments are described above for instructional purposes, the teachings of this patent document have general applicability and are not limited to the specific embodiments described above. In some examples, the ACLF/RM includes no AC inlet socket, but rather the ACLF/RM module has terminals that are designed to be soldered directly to a printed circuit board. In other examples, the AC input socket is another type of socket other than an IEC60320-1 C14 inlet socket. The socket can, for example, be an IEC60320-1 C13 inlet socket, an IEC60320-1 C15 inlet socket, an IEC60320-1 C16 inlet socket, an IEC60320-1 C20 inlet socket, or another suitable type of socket or connector. The ACLF/RM may, or may not, include a finger-manipulatable ON/OFF switch. The ACLF/RM may, or may not, include a fuse. Although in the specific examples set forth above there are two only two cores disposed within the housing of the ACLF/RM, in other examples the EMI filtering circuit is different and may include other inductive components including one or more additional toroidal cores. For example the capacitors 16 and 17 may not in all embodiments be coupled directly to the P and N module output terminals as illustrated in FIG. 8 and FIG. 9, but rather in some embodiments there is another two-winding inductor (transformer) coupled between the two capacitors 16 and 17 and the P and N DC output module terminals where yet another additional two-terminal capacitor is provided and is coupled directly across the P and N DC output module terminals. Although an example is set forth where the rectifier that employs a low forward voltage rectifier is a full-wave bridge rectifier that includes four such low forward voltage rectifiers, other forms of rectifiers can be employed in an ACLF/RM. Although examples of ACLF/RMs are set forth above where the housings include metal case portions and metal cover portions, in other examples of ACLF/RMs a part of the housing (such as a bottom face portion) is not made of metal. Additional techniques may be employed to provide better thermal contact between the TO-262 packages and the metal housing of the ACLF/RM. For example, the TO-262 packages may be connected to a piece of a multi-piece housing in the same way that a TO-262 package would ordinarily be connected to a heat-sink, except that the TO-262 packages are disposed within the housing and are fixed to the inside surface of the housing. Accordingly, various modifications, adaptations, and combinations of various features of the described embodiments can be practiced without departing from the scope of the invention as set forth in the claims.

What is claimed is:

1. An AC Line Filter/Rectifier Module (ACLF/RM) comprising:
    a plurality of AC input module terminals adapted to receive an AC input voltage signal onto the AC Line Filter/Rectifier module, wherein the plurality of AC input module terminals are parts of an IEC60320 AC power socket;
    a plurality of DC output module terminals adapted to output a full wave rectified version of the AC input voltage signal, wherein the DC output module terminals include a DC ground terminal;
    at least one low forward voltage rectifier, wherein the at least one low forward voltage rectifier comprises:
        a bipolar junction transistor having an emitter, a base, and a collector; and
        a diode having a cathode and an anode, wherein the cathode is coupled to one of the collector and the emitter of the bipolar transistor, wherein the anode is coupled to the other of the collector and the emitter of the bipolar transistor; and
    a metal housing that houses a first winding and the at least one low forward voltage rectifier, wherein the IEC60320 AC power socket is secured with respect to the metal housing, and wherein the plurality of DC output module terminals are secured with respect to the metal housing.

2. The ACLF/RM of claim 1, wherein the IEC60320 AC power socket is taken from the group consisting of: an IEC60320-1 C13 inlet socket, an IEC60320-1 C14 inlet socket, an IEC60320-1 C15 inlet socket, an IEC60320-1 C16 inlet socket, and an IEC60320-1 C20 inlet socket.

3. The ACLF/RM of claim 1, further comprising:
    a two-winding inductor, wherein the two-winding inductor is housed in the metal housing, the two-winding inductor comprising:
        a core;
        the first winding wound on the core, wherein the first winding has a first terminal and a second terminal, wherein the first terminal of the first winding is coupled to the base of the bipolar transistor of the low forward voltage rectifier, wherein the second terminal of the first winding is coupled to one of the AC input module terminals of the ACLF/RM; and
        a second winding wound on the core.

4. The ACLF/RM of claim 3, wherein the second terminal of the first winding is coupled to one of the AC input module terminals at least in part via a manual, mechanical switch.

5. The ACLF/RM of claim 1, further comprising:
a two-winding inductor, wherein the two-winding inductor is housed in the metal housing, the two-winding inductor comprising:
a core;
the first winding wound on the core, wherein the first winding has a first terminal and a second terminal, wherein the first terminal of the first winding is coupled to the base of the bipolar transistor of the low forward voltage rectifier; and
a second winding wound on the core.

6. The ACLF/RM of claim 1, further comprising:
a core;
the first winding wound on the core;
a second winding wound on the core;
a first capacitor having a first lead and a second lead, wherein the first lead of the first capacitor is coupled to a first terminal of the first winding, and wherein the second lead of the first capacitor is coupled to a first terminal of the second winding;
a second capacitor having a first lead and a second lead; and
a third capacitor having a first lead and a second lead, wherein the first lead of the third capacitor is coupled to the second lead of the second capacitor, and wherein the core, the first winding, the second winding, the first capacitor, the second capacitor and the third capacitor are all housed inside the metal housing.

7. The ACLF/RM of claim 6, wherein the first lead of the second capacitor is directly coupled to a first of the DC output module terminals, and wherein the second lead of the third capacitor is directly coupled to a second of the DC output module terminals.

8. The ACLF/RM of claim 6, wherein the first lead of the second capacitor is not directly coupled to a first of the DC output module terminals, and wherein the second lead of the third capacitor is not directly coupled to a second of the DC output module terminals.

9. The ACLF/RM of claim 1, wherein the bipolar transistor has a reverse breakdown withstand voltage of at least 200 volts.

10. The ACLF/RM of claim 1, wherein the ACLF/RM comprises a full wave rectifier, wherein the full wave rectifier comprises four low forward voltage rectifiers.

11. The ACLF/RM of claim 1, wherein the ACLF/RM comprises a plurality of low forward voltage rectifiers, wherein at least one of the low forward voltage rectifiers of the ACLF/RM comprises an NPN bipolar transistor, and wherein at least one of the low forward voltage rectifiers of the ACLF/RM comprises an PNP bipolar transistor.

12. The ACLF/RM of claim 1, wherein the plurality of AC input module terminals includes a line AC input module terminal, a ground input module terminal and a neutral AC input module terminal.

13. The ACLF/RM of claim 12, further comprising:
a switch adapted to be accessible from outside the metal housing such that a finger of a user can manually manipulate the switch and thereby disconnect the line AC input module terminal from the bipolar junction transistor.

14. An AC Line Filter/Rectifier Module (ACLF/RM) comprising:
a plurality of AC input module terminals adapted to receive an AC input voltage signal onto the AC Line Filter/Rectifier module, wherein the plurality of AC input module terminals are parts of an IEC60320 AC power socket;
a plurality of DC output module terminals adapted to output a full wave rectified version of the AC input voltage signal;
at least one low forward voltage rectifier, wherein the at least one low forward voltage rectifier comprises:
a bipolar junction transistor having an emitter, a base, and a collector; and
a diode having a cathode and an anode, wherein the cathode is coupled to one of the collector and the emitter of the bipolar transistor, wherein the anode is coupled to the other of the collector and the emitter of the bipolar transistor;
a metal housing that houses the at least one low forward voltage rectifier, wherein the IEC60320 AC power socket is secured with respect to the metal housing, and wherein the plurality of DC output module terminals are secured with respect to the metal housing;
a first capacitor having a first lead and a second lead, wherein the first lead of the first capacitor is coupled to a first of the plurality of AC input module terminals, and wherein a second lead of the first capacitor is coupled to a third of the plurality of AC input module terminals;
a second capacitor having a first lead and a second lead, wherein the first lead of the second capacitor is coupled to a first of the plurality of DC output module terminals, and wherein a second lead of the second capacitor is coupled to a second of the plurality of DC output module terminals; and
a third capacitor having a first lead and a second lead, wherein the first lead of the third capacitor is coupled to the second of the plurality of DC output module terminals, wherein a second lead of the third capacitor is coupled to a third of the plurality of DC output module terminals, wherein the second of the plurality of DC output terminals is coupled to a second of the AC input module terminals, and wherein the first, second and third capacitors are housed in the metal housing.

15. An AC Line Filter/Rectifier Module comprising:
a first module terminal;
a second module terminal;
a third module terminal;
a fourth module terminal;
a fifth module terminal, wherein the first module terminal is coupled through the module to the second module terminal;
a sixth module terminal;
a first capacitor having a first lead and a second lead;
a second capacitor having a first lead coupled to the fourth module terminal and a second lead coupled to the fifth module terminal;
a third capacitor having a first lead coupled to the fifth module terminal and a second lead coupled to the sixth module terminal;
a first bipolar transistor having an emitter coupled to the fourth module terminal, and having a collector, and having a base;
a first diode having a cathode coupled to the emitter of the first bipolar transistor and having an anode coupled to the collector of the first bipolar transistor;
a second bipolar transistor having an emitter coupled to the sixth module terminal, and having a collector coupled to the collector of the first bipolar transistor, and having a base coupled to the base of the first bipolar transistor;

a second diode having a cathode coupled to the collector of the second bipolar transistor and having an anode coupled to the emitter of the second bipolar transistor;

a third bipolar transistor having an emitter coupled to the fourth module terminal, and having a collector, and having a base;

a third diode having a cathode coupled to the emitter of the third bipolar transistor and having an anode coupled to the collector of the third bipolar transistor;

a fourth bipolar transistor having an emitter coupled to the sixth module terminal, and having a collector coupled to the collector of the third bipolar transistor, and having a base coupled to the base of the third bipolar transistor;

a fourth diode having a cathode coupled to the collector of the fourth bipolar transistor and having an anode coupled to the emitter of the fourth bipolar transistor;

a first core;

a first winding wound on the first core, wherein a first terminal of the first winding is coupled to the base of the first bipolar transistor, wherein a second terminal of the first winding is coupled to the first lead of the first capacitor;

a second winding wound on the first core, wherein a first terminal of the second winding is coupled to the base of the third bipolar transistor, and wherein a second terminal of the second winding is coupled to the second lead of the first capacitor;

a second core;

a third winding wound on the second core, wherein a first terminal of the third winding is coupled to the collector of the first bipolar transistor, and wherein a second terminal of the third winding is coupled to the first lead of the first capacitor;

a fourth winding wound on the second core, wherein a first terminal of the fourth winding is coupled to the collector of the third bipolar transistor, and wherein a second terminal of the fourth winding is coupled to the second lead of the first capacitor; and a metal housing that houses: 1) the first, second and third capacitors, 2) the first, second, third and fourth bipolar transistors, 3) the first, second, third and fourth diodes, 4) the first and second cores, and 5) the first, second, third and fourth windings.

16. The ACLF/RM of claim 15, further comprising:

a double-pole single-throw switch, wherein the first lead of the first capacitor is coupled to a first terminal of the switch, and wherein the second lead of the first capacitor is coupled to a second terminal of the switch, wherein a third terminal of the switch is coupled to the first module terminal, and wherein the fourth terminal of the switch is coupled to the third module terminal.

17. The ACLF/RM of claim 16, wherein one of the third and fourth terminals of the switch is coupled to a module terminal via a fuse.

18. An AC Line Filter/Rectifier Module comprising:

a first module terminal;
a second module terminal;
a third module terminal;
a fourth module terminal;
a fifth module terminal, wherein the first module terminal is coupled through the module to the second module terminal;
a sixth module terminal;

a first capacitor having a first lead and a second lead;

a second capacitor having a first lead coupled to the fourth module terminal and a second lead coupled to the fifth module terminal;

a third capacitor having a first lead coupled to the fifth module terminal and a second lead coupled to the sixth module terminal;

a first core;

a first winding wound on the first core, wherein a first terminal of the first winding is coupled to the fourth module terminal;

a second winding wound on the first core, wherein a first terminal of the second winding is coupled to the sixth module terminal;

a second core;

a third winding wound on the second core, wherein a first terminal of the third winding is coupled to the fourth module terminal;

a fourth winding wound on the second core, wherein a first terminal of the fourth winding is coupled to the sixth module terminal;

a first bipolar transistor having an emitter coupled to the first lead of the first capacitor, and having a base coupled to the second terminal of the second winding, and having a collector coupled to the second terminal of the fourth winding;

a first diode having a cathode coupled to the emitter of the first bipolar transistor and having an anode coupled to the collector of the first bipolar transistor;

a second bipolar transistor having an emitter coupled to the emitter of the first bipolar transistor, and having a base coupled to the second terminal of the first winding, and having a collector coupled to the second terminal of the third winding;

a second diode having a cathode coupled to the collector of the second bipolar transistor and having an anode coupled to the emitter of the second bipolar transistor;

a third bipolar transistor having an emitter coupled to the second lead of the first capacitor, and having a collector coupled to the collector of the first bipolar transistor and to the second terminal of the fourth winding, and having a base coupled to the base of the first bipolar transistor;

a third diode having a cathode coupled to the emitter of the third bipolar transistor and having an anode coupled to the collector of the third bipolar transistor;

a fourth bipolar transistor having an emitter coupled to the emitter of the third bipolar transistor, and having a base coupled to the base of the second bipolar transistor, and having a collector coupled to the collector of the second bipolar transistor;

a fourth diode having a cathode coupled to the collector of the fourth bipolar transistor and having an anode coupled to the emitter of the fourth bipolar transistor; and a metal housing that houses: 1) the first, second and third capacitors, 2) the first, second, third and fourth bipolar transistors, 3) the first, second, third and fourth diodes, 4) the first and second cores, and 5) the first, second, third and fourth windings.

19. The ACLF/RM of claim 18, further comprising:

a double-pole single-throw switch, wherein the first lead of the first capacitor is coupled to a first terminal of the switch, and wherein the second lead of the first capacitor is coupled to a second terminal of the switch, wherein a third terminal of the switch is coupled to the first module terminal, and wherein the fourth terminal of the switch is coupled to the third module terminal.

20. The ACLF/RM of claim 19, wherein one of the third and fourth terminals of the switch is coupled to a module terminal via a fuse.

21. A method comprising:
providing a low forward voltage rectifier in an AC line filter module, wherein the low forward voltage rectifier comprises a bipolar transistor and a diode, wherein the bipolar transistor has an emitter, a base, and a collector, wherein a cathode of the diode is coupled to one of the collector and the emitter of the bipolar transistor, and wherein an anode of the diode is coupled to the other of the collector and the emitter of the bipolar transistor; and
providing the AC line filter module with a housing, an IEC60320 AC inlet socket and a plurality of DC output module terminals, wherein the housing is metal, and wherein the DC output module terminals include a DC ground terminal connected to the housing.

22. The method of claim 21, further comprising:
providing a first two-winding inductor in the housing, wherein the first two-winding inductor comprises a first core, a first winding, and a second winding, wherein a terminal of the first winding is coupled to the base of the bipolar transistor; and
providing a second two-winding inductor in the housing, wherein the second two-winding inductor comprises a second core, a third winding, and a fourth winding, wherein a terminal of the third winding is coupled to the collector of the bipolar transistor.

23. The method of claim 22, wherein the low forward voltage rectifier is housed inside the housing, wherein the IEC60320 AC inlet socket is secured with respect to the housing, and wherein the DC ground terminal is secured to the outside of the housing.

24. The method of claim 22, wherein the low forward voltage rectifier is a part of a full-wave bridge rectifier, and wherein the full-wave bridge rectifier is housed inside the housing.

25. An assembly comprising:
a plurality of AC input terminals that are part of an IEC60320 AC inlet socket;
a plurality of DC output terminals including a DC ground terminal;
means for performing EMI filtering and for rectifying an AC voltage signal received onto the AC input terminals and for outputting a full wave rectified version of the AC voltage signal onto the plurality of DC output terminals, wherein the means comprises four low forward voltage rectifiers, wherein each of the low forward voltage rectifiers has a maximum forward voltage drop that is substantially less than 1.0 volt, and wherein each of the low forward voltage rectifiers comprises a bipolar transistor and a parallel-connected diode; and
a metal housing that houses the means, wherein the IEC60320 AC inlet socket is secured with respect to the metal housing, and wherein the DC ground terminal is secured to the outside of the metal housing.

26. The assembly of claim 25, wherein the means further comprises a first two-winding inductor and a second two-winding inductor.

27. The assembly of claim 26, wherein a terminal of a winding of the first two-winding inductor is coupled to a base of a bipolar transistor of the means, and wherein a terminal of a winding of the second two-winding inductor is coupled to a collector of the bipolar transistor of the means.

28. The assembly of claim 25, wherein the means for performing EMI filtering includes a three-terminal capacitor.

29. The assembly of claim 25, wherein the metal housing is a means for performing EMI shielding.

* * * * *